Nov. 3, 1942.　　　S. W. E. ANDERSSON　　　2,300,899
THERMOSTATIC WATER VALVE
Filed Nov. 22, 1938
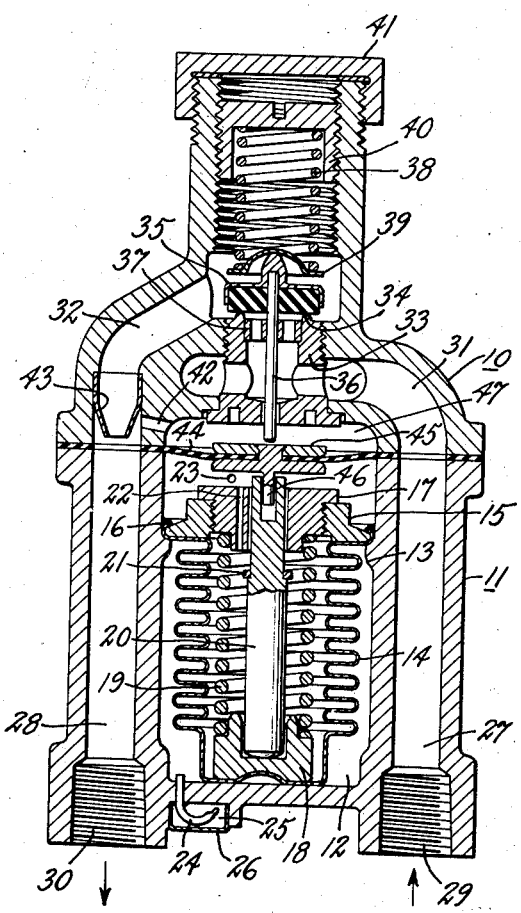
INVENTOR.
Sven W. E. Andersson
BY
D. E. Heath
ATTORNEY.

Patented Nov. 3, 1942

2,300,899

UNITED STATES PATENT OFFICE 2,300,899

THERMOSTATIC WATER VALVE

Sven W. E. Andersson, Evansville, Ind., assignor to Servel, Inc., New York, N. Y., a corporation of Delaware Application November 22, 1938, Serial No. 241,748

3 Claims. (Cl. 236—93)

My invention relates to thermostatic water valves and it is an object of the invention to provide a valve having improved sensitivity, as set forth in the following description and the accompanying drawing which shows in vertical cross-section a control valve embodying the invention.

The valve comprises a casing having an upper portion 10 and a lower portion 11. The portions 10 and 11 may be formed as castings, in which case they should be hot tin dipped after machining to seal the pores, or they may be formed as brass forgings.

The lower portion 11 of the valve casing is provided centrally with a cylindrical chamber 12. In the chamber 12 is a circumferential ledge 13. An expansible bellows 14 is located in the chamber 12. The upper end of the bellows is secured to a collar 15. The collar 15 and the bellows are secured in sealing engagement 16 with the ledge 13. A bushing 17 is threaded into the collar 15. A block 18 is positioned in the lower closed end of the bellows 14. A load spring 19 is compressed within the bellows 14. One end of the load spring 19 bears against the block 18 and the opposite end bears against the bushing 17. A plunger 20 is located centrally within the bellows 14 and the load spring 19. The lower end of the plunger 20 fits into a recess in the block 18. The other end of the plunger extends through a central opening in the member 17. The plunger 20 is provided with a shoulder 21 adapted to abut the bushing 17. A small hole 22 extends through the bushing 17. Another small hole 23 extends through the wall of the casing to the atmosphere.

The chamber 12 contains a volatile fluid such as ethyl chloride which is charged into the chamber outside of the bellows 14 through a tube 24. After charging, the tube 24 is sealed off and bent into a recess 25, which is covered with a protective cap 26.

On opposite sides of chamber 12 in the lower casing 11 are passages 27 and 28 having threaded parts 29 and 30 for pipe connections.

The upper portion 10 of the casing is provided with passages 31 and 32. A valve assembly is interposed between passages 31 and 32. A valve assembly includes a bushing 33 having a valve seat 34, a valve member 35, and a valve stem 36 secured to the valve member 35. A valve stem guide 37 is secured in the upper part of bushing 33. The opening in the lower end of bushing 33 is in line with the central opening of the valve stem guide 37. The valve stem 36 extends through the guide 37 and the opening in the lower end of the bushing 33. This opening provides a very slight clearance around the stem 36.

A spring 38 is provided to exert closing pressure on the valve member 35. One end of the spring rests against a cupped washer 39 which fits over the valve member 35. The opposite end of the spring 38 bears against a screw 40 which is threaded in an opening in the upper end of casing 10 so that it may be adjusted to vary the tension of the spring. A screw cap 41 covers the adjustment opening in the casing 10.

The upper portion 10 and the lower portion 11 of the valve casing are bolted together with a diaphragm 44 between them. The diaphragm 44 is flexible and waterproof. The diaphragm 44 is provided with openings which align with passages 27 and 31 on one side of the casing and passages 28 and 32 on the other side of the casing. The diaphragm 44 forms a gasket for sealing the joint between the two parts of the valve casing and the central part of the diaphragm separates chamber 47 in the upper part of the casing from the central chamber in the lower part of the casing. A solid bushing 45 is secured to the center of the diaphragm 44. On the bottom of the bushing 45 is a pin 46 which extends slidably into a central bore in the upper end of the plunger 20.

A small passage 42 in the upper casing 10 provides an opening from chamber 47 above the diaphragm 44 into the passage 32. In passage 32 is an ejector nozzle 43 which is located opposite the opening of passage 42.

The above described valve may be used, for instance, to control flow of cooling water for refrigeration apparatus responsive to temperature of the outlet water. The outlet conduit may be connected to the valve inlet passage 27 at 29. A discharge conduit may be connected to the valve outlet passage 28 at 30.

The valve member 34 is held closed against the valve seat 33 by the force of spring 38. A relatively small flow of water enters passage 27, flows through passage 31, and leaks through the space around valve stem 36 into the chamber 47. The water flows from chamber 47 through passage 42 into passage 32 and thence through passage 28 to discharge. The diaphragm 44 forming one side of the chamber 47 serves to keep water out of contact with chamber 12, and thereby prevent corrosion of the parts therein.

As the temperature of the water increases, the heat of the water is transmitted to the volatile fluid in chamber 12 through the walls of this chamber. Increase in temperature causes expansion of the volatile fluid in chamber 12 outside the bellows 14. The inside of the bellows 14 is at atmospheric pressure due to the hole 22 in member 17, and the hole 23 in the outer wall of the casing. Due to expansion of the volatile fluid, the bellows 14 is compressed against the force of load spring 19. Compression of the bellows forces operating plunger 20 upward against member 45 on the diaphragm 44. The movement of plunger 20 is limited by the shoulder 21 to limit compression of the bellows during charging and testing before assembly of the valve. The upward movement of plunger 20 is transmitted through the member 45 to the valve stem 36. Movement of the valve stem 36 lifts the valve member 35 from the valve seat 34, against the pressure of spring 38, thereby permitting increased water flow through the valve. The tension of spring 38 may be adjusted by means of the screw 40 to cause the valve to open at a desired water temperature.

The increased water flow continues until the temperature of the water is reduced. The reduction in temperature is transmitted to the volatile fluid in chamber 12, causing it to contract. Upon contraction of the volatile fluid, bellows 14 expands under the tension of both springs 19 and 38, and the valve member 35 moves toward valve seat 34.

With the valve member 35 closed, the flow through the bypass chamber 41, which may be termed bypass or leakage flow, continues until the water temperature increases to a point where the above described operation of the valve is repeated. The walls of the chamber 12 are made relatively thin to permit good heat transfer therethrough, and consequent quick response of the valve to temperature changes.

The ejector 43 relieves pressure against the diaphragm 44 during increased water flow through the valve by accelerating the withdrawal of water from the bypass chamber 41 through passage 42 during such increased flow. The increased pressure above diaphragm 44 upon increase in water flow would have an adverse effect on the sensitivity of the control so that the ejector 43 by decreasing the pressure against the diaphragm during increased water flow, serves to improve the sensitivity of the valve.

What is claimed is:

1. A thermostatic water regulator comprising a casing having a passage for flow of water therethrough, a valve for controlling flow of water through said passage, said casing also having a passage for permitting limited flow of water when said valve is closed, a chamber in said casing having an opening to atmosphere, a flexible waterproof diaphragm forming a wall portion of said chamber, and a thermostat located in said chamber and said chamber being located so that the thermostat therein is subjected to temperature of water in said first passage, said thermostat being connected to said valve through said diaphragm so as to cause opening movement of said valve upon increase in temperature and closing movement of said valve upon decrease in temperature.

2. A thermostatic water regulator comprising a casing having a passage for flow of water therethrough, a valve for controlling flow of water through said passage, said casing also having a chamber open to atmosphere, a flexible waterproof diaphragm forming a wall portion of said chamber, an expansible fluid thermostat located in said chamber and said chamber being located so that the thermostat therein is subjected to temperature of water in said passage, said thermostat being connected to said valve through said diaphragm so as to cause opening movement of said valve upon increase in temperature, and closing movement of said valve upon decrease in temperature, said casing also having a bypass conduit for limited flow of water around said valve, said diaphragm forming a wall part of said conduit, and an ejector nozzle in said passage arranged to accelerate flow of water through said bypass conduit upon increase in rate of water flow through said passage.

3. A thermostatic water regulator comprising a casing provided with wall members forming a passage for flow of water therethrough, a valve member for controlling flow of water through said passage, said casing also having a passage permitting limited flow of water around said valve, a thermostat containing a volatile fluid and so located and arranged that a wall member of the casing serves to conduct heat in a direction normal to the plane thereof from water flowing through said passage to the volatile fluid, and a flexible wall member so arranged between said thermostat and said valve as to keep water out of contact with the thermostat, said thermostat being connected to said valve through said flexible wall member so as to cause opening movement of the valve upon increase in temperature and closing movement of the valve upon decrease in temperature.

SVEN W. E. ANDERSSON.